US012697887B2

(12) United States Patent (10) Patent No.: US 12,697,887 B2
Song et al. (45) Date of Patent: Aug. 4, 2026

(54) STRUCTURAL BATTERY FOR VEHICLE

(71) Applicants:Hyundai Motor Company, Seoul
(KR); Kia Corporation, Seoul (KR);
**Korea Advanced Institute of Science
and Technology**, Daejeon (KR)

(72) Inventors: Won Ki Song, Seongnam-si (KR);
Chun-Gon Kim, Daejeon (KR); **Hyun
Wook Park, Daejeon (KR); Joo-Seung
Choi, Daejeon (KR); Jung-Eon Noh**,
Daejeon (KR)

(73) Assignees: Hyundai Motor Company, Seoul
(KR); Kia Corporation, Seoul (KR);
**Korea Advanced Institute of Science
and Technology**, Daejeon (KR)

( * ) Notice: Subject to any disclaimer, the term of this
patent is extended or adjusted under 35
U.S.C. 154(b) by 295 days.

(21) Appl. No.: 18/472,454

(22) Filed: Sep. 22, 2023

(65) Prior Publication Data

US 2024/0100969 A1 Mar. 28, 2024

(30) Foreign Application Priority Data

Sep. 26, 2022 (KR) ........................ 10-2022-0121550

(51) Int. Cl.
*B60K 1/04* (2019.01)
*B60L 50/60* (2019.01)
*B60L 50/64* (2019.01)
*B62D 25/06* (2006.01)
*B62D 25/20* (2006.01)
*H01M 10/0585* (2010.01)
*H01M 50/249* (2021.01)

*H01M 50/296* (2021.01)
*H01M 50/298* (2021.01)

(52) U.S. Cl.
CPC ................ *B60L 50/64* (2019.02); *B60K 1/04*
(2013.01); *B60L 50/66* (2019.02); *B62D 25/06*
(2013.01); *B62D 25/20* (2013.01); *H01M
10/0585* (2013.01); *H01M 50/249* (2021.01);
*H01M 50/296* (2021.01); *H01M 50/298*
(2021.01); *B60K 2001/0438* (2013.01); *H01M
2220/20* (2013.01)

(58) Field of Classification Search
CPC ... B60K 1/04; B60K 2001/0438; B60L 50/64;
B60L 50/66; H01M 50/249; H01M
50/502; H01M 50/296; H01M 2220/20;
H01M 50/298; H01M 50/522
See application file for complete search history.

(56) References Cited

U.S. PATENT DOCUMENTS 10,730,460 B2* 8/2020 Pawlowski ............ B62D 33/06
2020/0321650 A1* 10/2020 Monismith ......... H01M 50/159
(Continued)

FOREIGN PATENT DOCUMENTS

KR 20210109730 A 9/2021

*Primary Examiner* — Marc Q Jimenez
*Assistant Examiner* — James J Triggs
(74) *Attorney, Agent, or Firm* — Slater Matsil, LLP

(57) ABSTRACT

An embodiment structural battery for an electric vehicle
includes an upper rail and a lower rail coupled with the
upper rail, wherein the upper rail and the lower rail are
electrically connected with each other by a terminal and a
wiring, so that the upper rail and the lower rail electrically
connected with each other serve as both the structural
battery and a roof rail of a vehicle body.

20 Claims, 15 Drawing Sheets

(56) References Cited

U.S. PATENT DOCUMENTS

| | | | |
|---|---|---|---|
| 2021/0273209 A1 | 9/2021 | Song | |
| 2021/0313586 A1 | 10/2021 | Abdul Jabbar | |
| 2023/0006200 A1 * | 1/2023 | Takano | ................. H01M 4/485 |

* cited by examiner

STRUCTURAL BATTERY FOR VEHICLE

CROSS-REFERENCE TO RELATED APPLICATIONS

This application claims the benefit of Korean Patent Application No. 10-2022-0121550, filed on Sep. 26, 2022, which application is hereby incorporated herein by reference.

TECHNICAL FIELD

The present invention relates to a structural battery for a vehicle.

BACKGROUND

In general, a lithium-ion battery mounted in an electric vehicle may not perform a load-bearing function at all although occupying a significant portion of the weight of the electric vehicle.

On the other hand, a structural battery may be a part installed in the frame or structure of the vehicle and simultaneously perform the load-bearing and charging/discharging functions of the battery. That is, the structural battery may serve as the battery while performing the function of the vehicle structure.

This battery may also be referred to as a mass-free energy storage device. The reason is that a weight of the battery belongs to a partial weight of the load-bearing structure, and it is thus considered that there is no weight of the battery itself that stores energy. This multi-function battery may significantly reduce the weight of the vehicle. When applied to the electric vehicle, the structural battery may allow the vehicle to have an improved cruising distance due to the reduced weight.

In addition, although the structural battery has a lower capacity than that of the lithium-ion battery, i.e., a capacity of about 20% of the lithium-ion battery, the electric vehicle may not require a separate battery to thus significantly reduce the weight of the vehicle, which results in less energy required to drive the electric vehicle.

Furthermore, the structural battery may have lower electrical energy density and higher stability.

As such, it is necessary to continuously research and develop the structural battery applied to the vehicle.

The above information disclosed in this background section is only for enhancement of understanding of the background of embodiments of the invention, and therefore it may contain information that does not form the prior art that is already known to a person of ordinary skill in the art.

SUMMARY

The present invention relates to a structural battery for a vehicle. Particular embodiments relate to a structural battery for a vehicle which may boost a voltage by applying the structural battery as a member of a vehicle body to be mechanically coupled with a vehicle part and electrochemically connected with a lithium-ion battery.

An embodiment of the present invention provides a structural battery for an electric vehicle which may supply power to a part requiring high output by using the structural battery of a double rail structure that is applied as a roof rail of a vehicle body and has a serial connection structure.

An embodiment of the present invention also provides a structural battery for an electric vehicle which may prevent damage to a current collector by inserting a wiring into the double rail structure to extract external power.

According to an embodiment of the present invention, a structural battery for an electric vehicle may include an upper rail and a lower rail coupled with each other, wherein the upper rail and the lower rail are electrically connected with each other by a terminal and a wiring to serve as the battery while being a roof rail of a vehicle body.

Structural reinforcement layers may be the outermost upper and lower layers of the upper rail and lower rail, respectively.

Between the structural reinforcement layer and the upper rail or the lower rail, an insulating layer and a sealing layer may be sequentially stacked starting from the structural reinforcement layer.

The upper rail or the lower rail may include one cell or a plurality of cells.

The upper rail may include two cells stacked on each other, and the lower rail may include one cell disposed under the upper rail.

The upper rail may include a first current collecting layer, a first electrode layer, a second current collecting layer, a second electrode layer, and a third current collecting layer which are sequentially stacked from top to bottom.

The lower rail may include a fourth current collecting layer, a third electrode layer, and a fifth current collecting layer which are sequentially stacked from top to bottom.

Each of the first to third electrode layers may include a positive electrode layer, an electrolyte layer, and a negative electrode layer sequentially stacked from top to bottom, the positive electrode layer and the negative electrode layer may be made of a positive electrode active material and a negative electrode active material respectively formed between glass fiber prepregs, and the electrolyte layer may be made of an electrolyte formed between the glass fibers.

On one side of the lower rail, a lower rail-negative electrode terminal may be interposed between the structural reinforcement layer and the fourth current collecting layer, and on the other side of the lower rail, a lower rail-positive electrode terminal may be interposed between the structural reinforcement layer and the fifth current collecting layer.

On one side of the upper rail, an upper rail-positive electrode terminal may be interposed between the structural reinforcement layer and the first current collecting layer, and on the other side of the upper rail, an upper rail-negative electrode terminal may be interposed between the structural reinforcement layer and the third current collecting layer.

The lower structural reinforcement layer of the upper rail and the upper structural reinforcement layer of the lower rail may be adhesively bonded with each other by a structural adhesive.

The lower rail-negative electrode terminal and the upper rail-positive electrode terminal may be adhesively bonded with each other by a conductive adhesive.

The lower rail-positive electrode terminal and the upper rail-negative electrode terminal may be electrically connected with each other by the wiring, and the wiring may be inserted into a flange groove positioned in an edge of a flange on which the lower rail is mounted and extracted to the outside of the lower rail.

The wiring may be formed by covering the negative electrode-wiring terminal and the positive electrode-wiring terminal by using a covering, the negative electrode-wiring terminal may be connected to the upper rail-negative electrode terminal, and the positive electrode-wiring terminal may be connected to the lower rail-positive electrode terminal.

The covering of the wiring may be adhesively fixed into the flange groove by a fixing adhesive.

The lower rail-positive electrode terminal and the upper rail-negative electrode terminal may be connected with each other in a direction perpendicular to the wiring to form an 'L'-shaped path.

In a structural battery for an electric vehicle according to another embodiment of the present invention, the upper rail may include one cell, and the lower rail may include two cells disposed under the upper rail.

In a structural battery for an electric vehicle according to still another embodiment of the present invention, the upper rail may include one cell, and the lower rail may include one cell disposed under the upper rail.

In a structural battery for an electric vehicle according to yet another embodiment of the present invention, the upper rail may include two cells stacked on each other, and the lower rail may include two cells disposed under the upper rail.

The structural battery for an electric vehicle according to embodiments of the present invention may boost the voltage by using the structural battery of the double rail structure that is applied as the roof rail of the vehicle body and has the serial connection structure.

The structural battery for an electric vehicle according to the embodiments of the present invention may also allow the vehicle to have the reduced weight and the improved cruising distance by simultaneously performing both the battery function and the frame of the vehicle body.

The structural battery may also prevent the damage to the current collector by inserting the wiring into the double rail structure to extract the external power.

Figure 1:
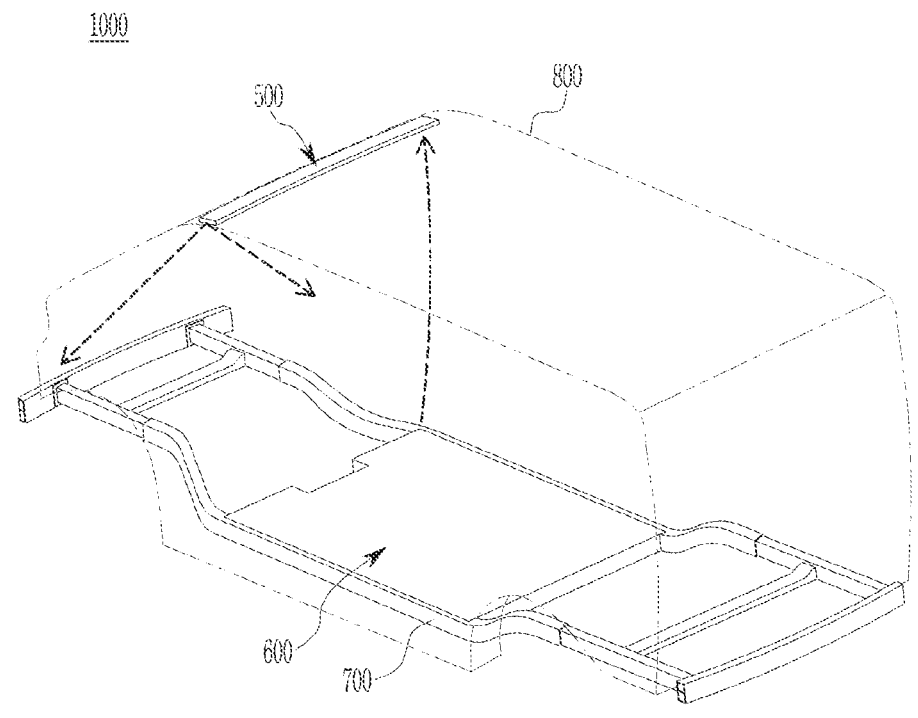
FIG. 1 is a schematic configuration diagram of an electric vehicle using a structural battery for an electric vehicle according to an embodiment of the present invention.

The following reference identifiers may be used in connection with the accompanying drawings to describe exemplary embodiments of the present disclosure.

100, 100', 100", 100"': upper rail
200, 200', 200", 200"': lower rail
300: wiring
110-1, 115-1, 210-1, 215-1: structural reinforcement layer
110-2, 110-3, 115-2, 115-3, 210-2, 210-3, 215-2, 215-3: insulating layer
110-4, 115-4, 210-4, 215-4: sealing layer
120, 160, 125, 220, 225, 260: current collecting layer
130, 140, 150, 170, 180, 190, 230, 240, 250, 270, 280, 290: electrode layer
12: upper rail-positive electrode terminal
14: upper rail-negative electrode terminal
22: lower rail-positive electrode terminal
24: lower rail-negative electrode terminal
275: structural adhesive
310: covering
330: positive electrode-wiring terminal
340: negative electrode-wiring terminal
285: conductive adhesive
320: fixing adhesive

DETAILED DESCRIPTION OF ILLUSTRATIVE EMBODIMENTS

Hereinafter, embodiments of the present invention will be described in detail with reference to the accompanying drawings for those skilled in the art to which the present invention pertains to easily practice the present invention. The present invention may be implemented in various different forms and is not limited to the embodiments provided herein.

In addition, in several embodiments, components having the same configuration will be representatively described using the same reference numerals in an embodiment, and only components different from those of an embodiment will be described in the other embodiments.

It should be understood that the drawings are schematic and not drawn to scale. The size and proportion of a component in the drawings are shown relatively exaggerated or reduced in size in order to clearly and easily explain the drawings. This arbitrary size is only illustrative and not limitative. In addition, the same reference numeral is used to denote a similar feature of the same structure, element or part shown in two or more drawings. When it is described that an element is referred to as being "on" or "above" another element, it is to be understood that the element may be directly "on" another element or "above" another element including a third element interposed therebetween.

An embodiment of the present invention may specifically describe one embodiment of the present invention. As a result, diagrams may be various modified. Accordingly, an embodiment is not limited to a specific shape of the illustrated portion, and may include, for example, a shape modified when produced.

Hereinafter, the description describes a structural battery for an electric vehicle according to an embodiment of the present invention with reference to FIGS. 1 through 8.

FIG. 1 is a schematic configuration diagram of an electric vehicle using a structural battery for an electric vehicle according to an embodiment of the present invention, FIGS.

Figure 2A:
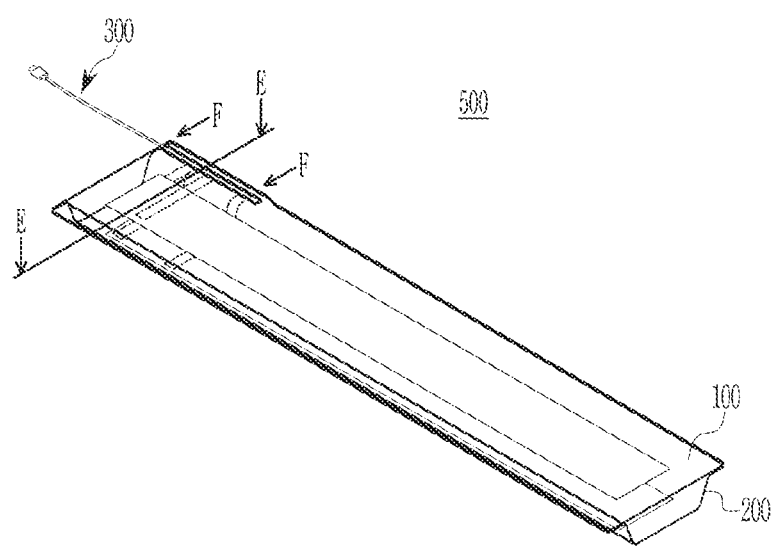
FIGS. 2A and 2B are configuration diagrams each showing the structural battery for an electric vehicle according to an embodiment of the present invention.
Figure 2B:
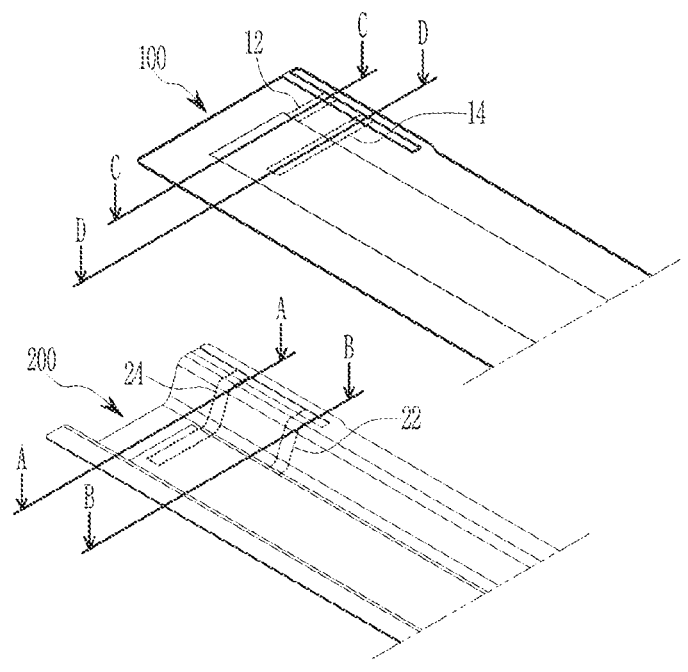
Figure 3:
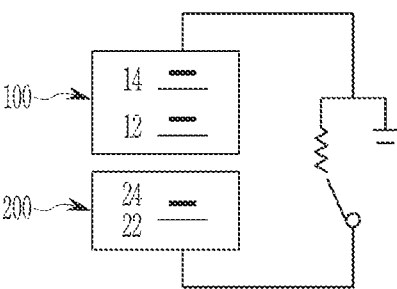
FIG. 3 is an equivalent circuit diagram of the structural battery shown in FIG. 2A.
Figure 4:
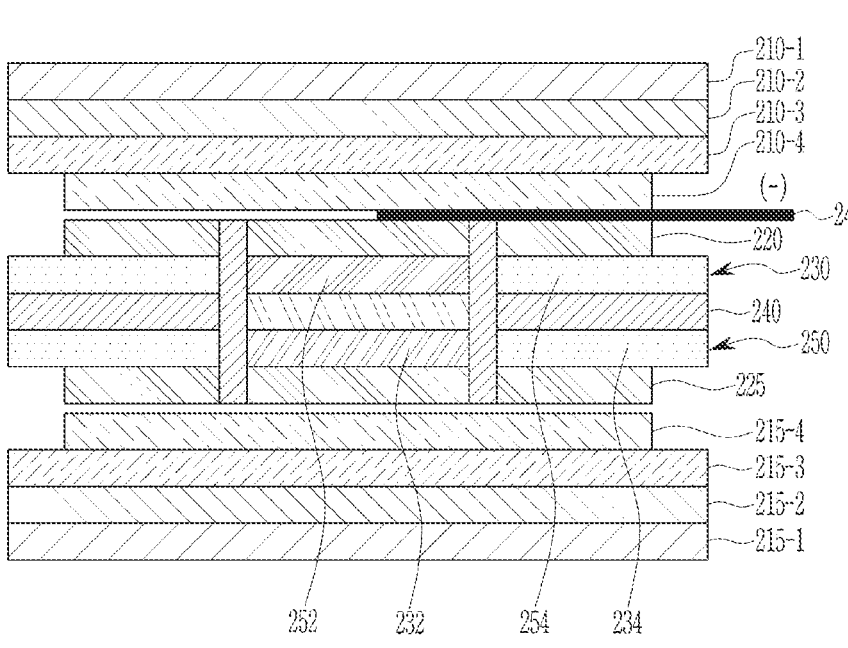
FIG. 4 is a cross-sectional view of the structural battery taken along line 'A-A' in FIG. 2B.
Figure 5:
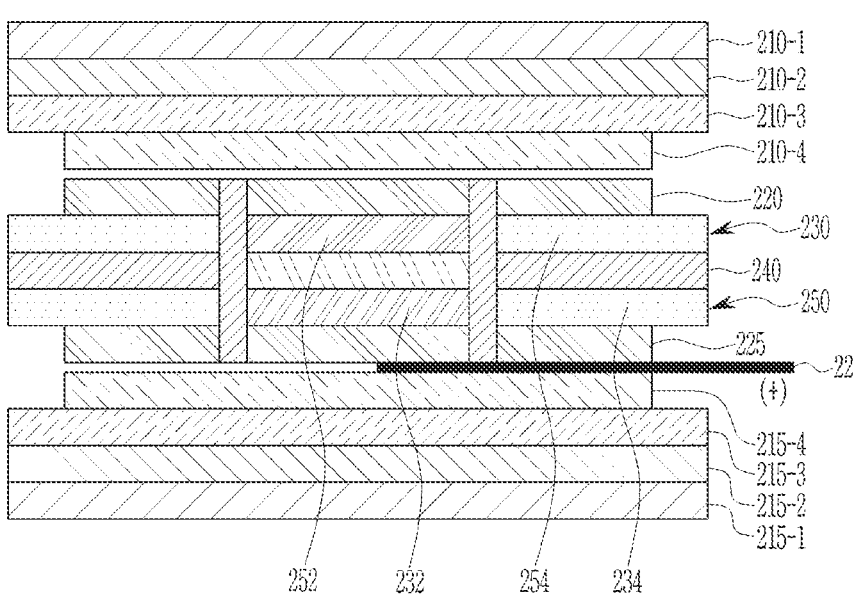
FIG. 5 is a cross-sectional view of the structural battery taken along line 'B-B' in FIG. 2B.
Figure 6:
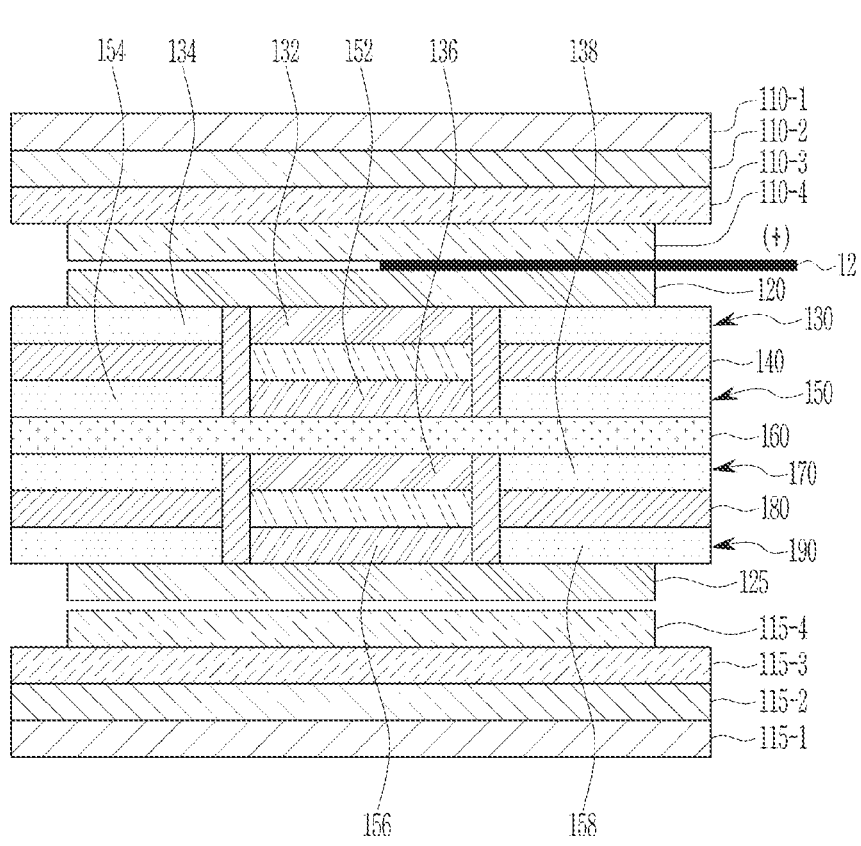
FIG. 6 is a cross-sectional view of the structural battery taken along line 'C-C' in FIG. 2B.
Figure 7:
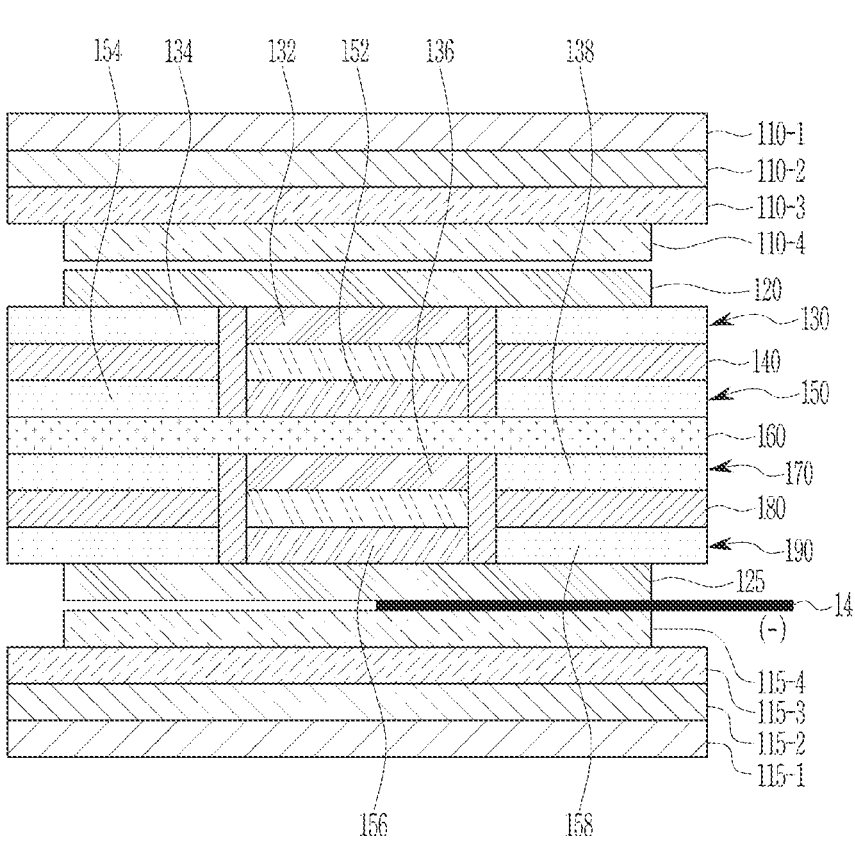
FIG. 7 is a cross-sectional view of the structural battery taken along line 'D-D' in FIG. 2B.
Figure 8:
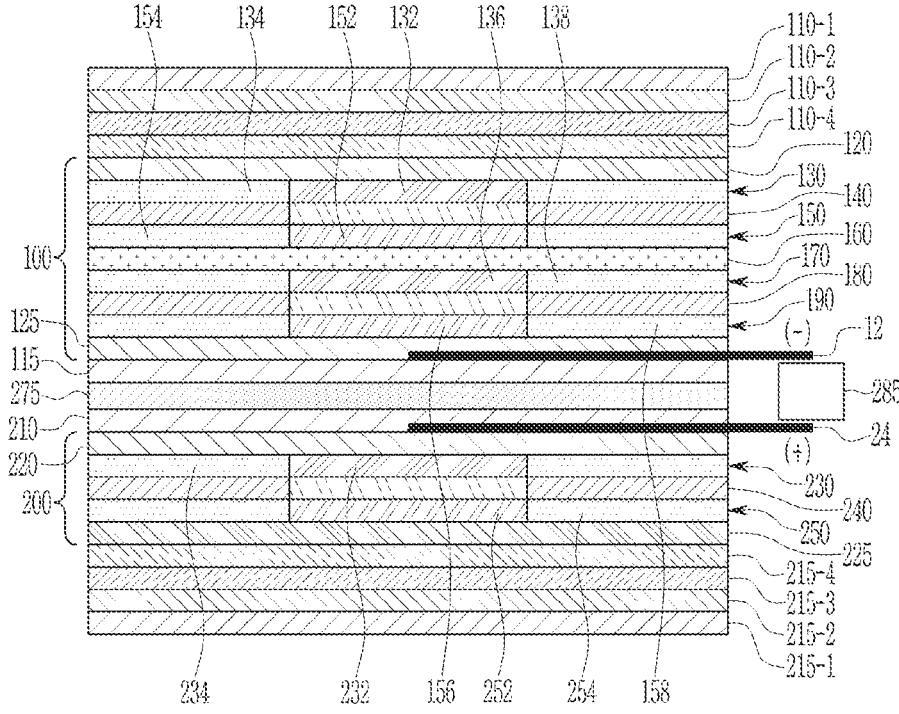
FIG. 8 is a cross-sectional view of the structural battery taken along line 'E-E' in FIG. 2A.

2A and 2B are configuration diagrams each showing the structural battery for an electric vehicle according to an embodiment of the present invention, FIG. 3 is an equivalent circuit diagram of the structural battery shown in FIG. 2A, FIG. 4 is a cross-sectional view of the structural battery taken along line 'A-A' in FIG. 2B, FIG. 5 is a cross-sectional view of the structural battery taken along line 'B-B' in FIG. 2B, FIG. 6 is a cross-sectional view of the structural battery taken along line 'C-C' in FIG. 2B, FIG. 7 is a cross-sectional view of the structural battery taken along line 'D-D' in FIG. 2B, and FIG. 8 is a cross-sectional view of the structural battery taken along line 'E-E' in FIG. 2A.

Referring to FIG. 1, in a structural battery 500 for an electric vehicle 1000 according to an embodiment of the present invention, the structural battery may be charged by being installed in front of a roof 800 of the vehicle in a transverse direction of the vehicle and connected with a high voltage battery 600 installed on a floor 700 of a vehicle body. Here, an electrical specification may be implemented using a converter, or the structural battery may be charged through a separate branch from a power cable.

As shown in FIGS. 2A and 2B, the structural battery 500 for the electric vehicle 1000 according to an embodiment of the present invention may include an upper rail 100 and a lower rail 200 vertically coupled with each other, wherein the upper rail 100 and the lower rail 200 are electrically connected with each other by a terminal and a wiring 300 to be a roof rail of the vehicle body and serve as the battery. The upper rail 100 or the lower rail 200 may include one cell or a plurality of cells.

In an embodiment of the present invention, the upper rail 100 may include two cells stacked on each other, and the lower rail 200 may include one cell disposed under the upper rail 100. Two cells of the upper rail 100 and one cell of the lower rail 200 may be connected in series with each other.

The upper rail 100 and the lower rail 200 may respectively have positive electrode terminals 12 and 22 and negative electrode terminals 14 and 24. The positive electrode terminal 12 of the upper rail 10 and the negative electrode terminal 24 of the lower rail 200, and the negative electrode terminal 14 of the upper rail 100 and the positive electrode terminal 22 of the lower rail 200 may be electrically connected in series with each other, respectively.

As shown in FIG. 3, the positive electrode terminal 12 of the upper rail 100 that includes two cells stacked on each other and the negative electrode terminal 24 of the lower rail 200 that includes one cell may be electrically connected in series with each other, and the negative electrode terminal 14 of the upper rail 100 and the positive electrode terminal 22 of the lower rail 200 may be electrically connected with each other by the wiring 300 to thus configure an entire circuit.

First, as shown in FIGS. 6 and 7, the upper rail 100 may include two cells, structural reinforcement layers 110-1 and 115-1 may be the outermost upper and lower layers, respectively, and under the upper structural reinforcement layer 110-1, insulating layers 110-2 and 110-3 and a sealing layer 110-4 may be sequentially stacked from top to bottom. Here, the insulating layers 110-2 and 110-3 may each be made of a GEP118 material, and the sealing layer 110-4 may be made of a SUS304 material. In addition, on the lower structure reinforcement layer 115-1, insulating layers 115-2 and 115-3 and a sealing layer 115-4 may be sequentially stacked from bottom to top.

Under the sealing layer 110-4, a first current collecting layer 120, first electrode layers 130, 140, and 150, a second current collecting layer 160, second electrode layers 170, 180, and 190, and a third current collecting layer 125 may be sequentially stacked. The sealing layer 115-4 may be stacked under the third current collecting layer 125.

The first electrode layers 130, 140, and 150 may include the positive electrode layer 130, the electrolyte layer 140, and the negative electrode layer 150 which are sequentially stacked from top to bottom. The positive electrode layer 130 and the negative electrode layer 150 may be made of a positive electrode active material 132 and a negative electrode active material 152 respectively formed between glass fiber prepregs 134 and 154, and the electrolyte layer 140 may be made of an electrolyte formed between the glass fibers.

The second current collecting layer 160 stacked under the first electrode layers 130, 140, and 150 may be made of a SUS material.

The second electrode layers 170, 180, and 190 stacked under the second current collecting layer 160 may include the positive electrode layer 170, the electrolyte layer 180, and the negative electrode layer 190 which are sequentially stacked from top to bottom. The positive electrode layer 170 and the negative electrode layer 190 may be made of a positive electrode active material 136 and a negative electrode active material 156 respectively formed between glass fiber prepregs 138 and 158, and the electrolyte layer 180 may be made of an electrolyte formed between the glass fibers.

As shown in FIG. 6, on one side of the upper rail 100, an upper rail-positive electrode terminal 12 may be interposed between the sealing layer 110-4 and the first current collecting layer 120, and as shown in FIG. 7, on the other side of the upper rail 100, an upper rail-negative electrode terminal 14 may be interposed between the sealing layer 115-4 and the third current collecting layer 125.

Meanwhile, as shown in FIGS. 4 and 5, the lower rail 200 may include one cell, structural reinforcement layers 210-1 and 215-1 may be the outermost upper and lower layers, respectively, and under the upper reinforcement layer 210-1, insulating layers 210-2 and 210-2 and a sealing layer 210-4 may be sequentially stacked from top to bottom. Here, the insulating layers 210-2 and 210-3 may each be made of the GEP118 material, and the sealing layer 210-4 may be made of the SUS304 material. In addition, on the lower structure reinforcement layer 215-1, insulating layers 215-2 and 215-3 and a sealing layer 215-4 may be sequentially stacked from bottom to top.

Under the sealing layer 210-4, a fourth current collecting layer 220, third electrode layers 230, 240, and 250, and a fifth current collecting layer 225 may be sequentially stacked. The sealing layer 215-4 may be stacked under the fifth current collecting layer 225.

The third electrode layers 230, 240, and 250 may include the positive electrode layer 230, the electrolyte layer 240, and the negative electrode layer 250 which are sequentially stacked from top to bottom. The positive electrode layer 230 and the negative electrode layer 250 may be made of a positive electrode active material 232 and a negative electrode active material 252 respectively formed between glass fiber prepregs 234 and 254, and the electrolyte layer 240 may be made of an electrolyte formed between the glass fibers.

As shown in FIG. 4, on one side of the lower rail 200, a lower rail-negative electrode terminal 24 may be interposed between the sealing layer 210-4 and the fourth current collecting layer 220, and as shown in FIG. 5, on the other side of the lower rail 200, a lower rail-positive electrode terminal 22 may be interposed between the sealing layer 215-4 and the fifth current collecting layer 225.

Referring to FIG. 8, in a state where the upper rail 100 and the lower rail 200 are coupled with each other as shown in FIG. 2A, the lower structural reinforcement layer 115 of the upper rail 100 and the upper structural reinforcement layer 210 of the lower rail 200 may be adhesively bonded with each other by a structural adhesive 275.

In addition, the upper rail-positive electrode terminal 12 and the lower rail-negative electrode terminal 24 may be electrically connected with each other by being adhesively bonded with each other by a conductive adhesive 285. Accordingly, two cells of the upper rail 100 and one cell of the lower rail 200 may be connected in series with each other.

Meanwhile, as shown in FIG. 2A, the lower rail-positive electrode terminal 22 and the upper rail-negative electrode terminal 14 may be electrically connected with each other by the wiring 300. The lower rail-positive electrode terminal 22 and the upper rail-negative electrode terminal 14 may be connected with each other in a direction perpendicular to the wiring 300 to form an 'L'-shaped path. In this case, when an external force is applied to the wiring 300, it is possible to protect the cell by preventing the force from being transmitted directly to the cell. The wiring 300 may be extracted to the outside of the upper rail 100 or the lower rail 200.

Figure 9:
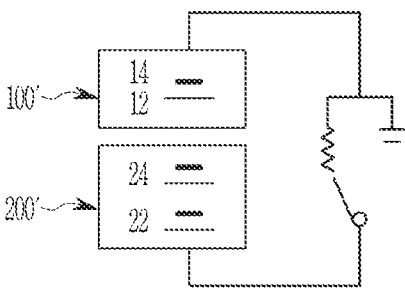
FIG. 9 is an equivalent circuit diagram of a structural battery for an electric vehicle according to another embodiment of the present invention.
Figure 10:
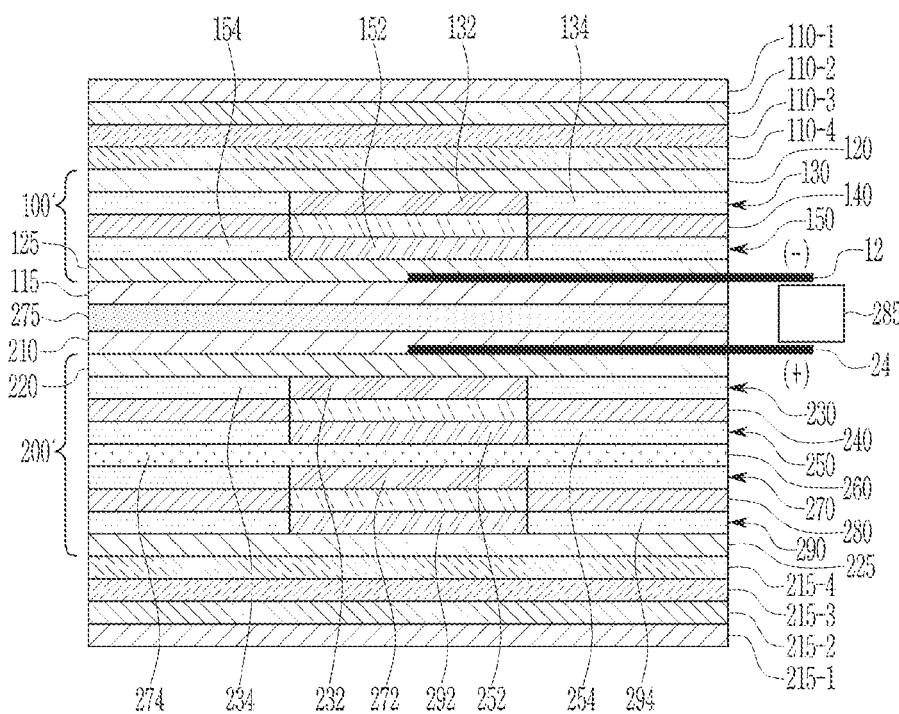
FIG. 10 is a cross-sectional view showing the structural battery for an electric vehicle of FIG. 9.

FIG. 9 is an equivalent circuit diagram of a structural battery for an electric vehicle according to another embodiment of the present invention, and FIG. 10 is a cross-sectional view showing the structural battery for an electric vehicle of FIG. 9.

As shown in FIG. 9, the positive electrode terminal 12 of an upper rail 100' that includes one cell and the negative electrode terminal 24 of a lower rail 200' that includes two cells stacked on each other may be electrically connected in series with each other, and the negative electrode terminal 14 of the upper rail 100' and the positive electrode terminal 22 of the lower rail 200' may be electrically connected with each other by the wiring 300 to thus configure an entire circuit.

As shown in FIG. 10, the upper rail 100' may include one cell, and the lower rail 200' may include two cells disposed under the upper rail 100'.

The structural reinforcement layer 110-1 may be the outermost upper layer of the upper rail 100', and under the upper structural reinforcement layer 110-1, the insulating layers 110-2 and 110-3 and the sealing layer 110-4 may be stacked from top to bottom. Under the sealing layer 110-4, the first current collecting layer 120 and the first electrode layers 130, 140, and 150 may be sequentially stacked. In addition, the third current collecting layer 125 may be stacked under the first electrode layers 130, 140, and 150.

The first electrode layers 130, 140, and 150 may include the positive electrode layer 130, the electrolyte layer 140, and the negative electrode layer 150 which are sequentially stacked from top to bottom. The positive electrode layer 130 and the negative electrode layer 150 may be made of the positive electrode active material 132 and the negative electrode active material 152 respectively formed between the glass fiber prepregs 134 and 154, and the electrolyte layer 140 may be made of the electrolyte formed between the glass fibers.

In addition, the lower rail 200' may include two cells, the structural reinforcement layer 215-1 may be the outermost lower layer of the lower rail 200', and on the structural reinforcement layer 215-1, the fourth current collecting layer 220, the third electrode layers 230, 240, and 250, a sixth current collecting layer 260, fourth electrode layers 270, 280, and 290, and the fifth current collecting layer 225 may be sequentially stacked from top to bottom.

The third electrode layers 230, 240, and 250 may include the positive electrode layer 230, the electrolyte layer 240, and the negative electrode layer 250 which are sequentially stacked from top to bottom. The positive electrode layer 230 and the negative electrode layer 250 may be made of the positive electrode active material 232 and the negative electrode active material 252 respectively formed between the glass fiber prepregs 234 and 254, and the electrolyte layer 240 may be made of the electrolyte formed between the glass fibers. The sixth current collecting layer 260 may be made of the SUS material.

The fourth electrode layers 270, 280, and 290 stacked under the sixth current collecting layer may include the positive electrode layer 270, the electrolyte layer 280, and the negative electrode layer 290 which are sequentially stacked from top to bottom. The positive electrode layer 270 and the negative electrode layer 290 may be made of a positive electrode active material 272 and a negative electrode active material 292 respectively formed between glass fiber prepregs 274 and 294, and the electrolyte layer 280 may be made of an electrolyte formed between the glass fibers.

Meanwhile, the lower structural reinforcement layer 115 of the upper rail and the upper structural reinforcement layer 210 of the lower rail may be adhesively bonded with each other by the structural adhesive 275.

The upper rail-positive electrode terminal 12 may be interposed between the lower structural reinforcement layer 115 and the third current collecting layer 125 of the upper rail, and the lower rail-negative electrode terminal 24 may be interposed between the upper structural reinforcement layer 210 and the fourth current collecting layer 220 of the lower rail.

The upper rail-positive electrode terminal 12 and the lower rail-negative electrode terminal 24 may be electrically connected with each other by being adhesively bonded with each other by the conductive adhesive 285. Accordingly, one cell of the upper rail and two cells of the lower rail may be connected in series with each other.

Figure 11:
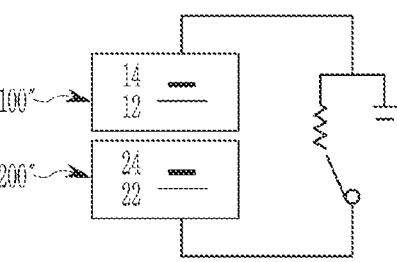
FIG. 11 is an equivalent circuit diagram of a structural battery for an electric vehicle according to still another embodiment of the present invention.
Figure 12:
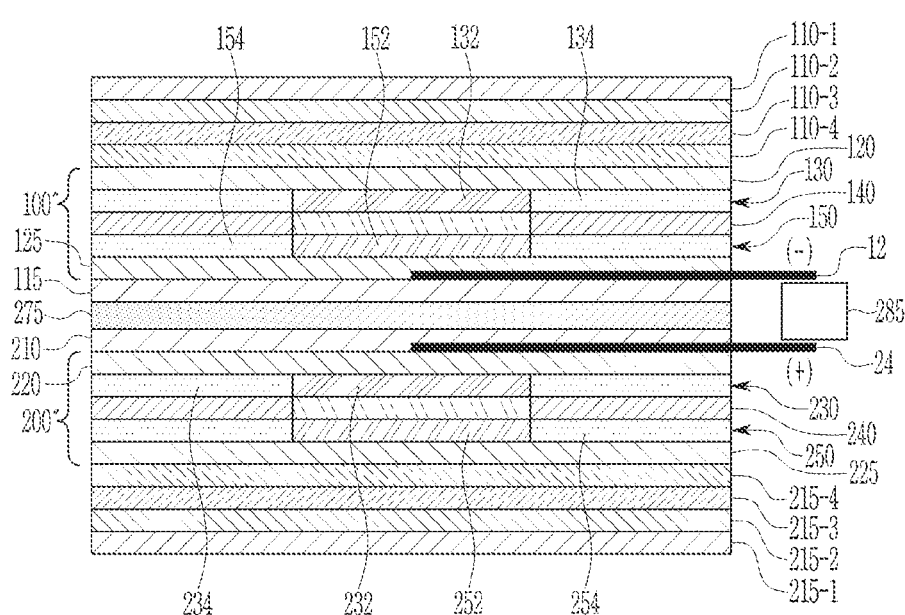
FIG. 12 is a cross-sectional view showing the structural battery for an electric vehicle of FIG. 11.

FIG. 11 is an equivalent circuit diagram of a structural battery for an electric vehicle according to still another embodiment of the present invention, and FIG. 12 is a cross-sectional view showing the structural battery for an electric vehicle of FIG. 11.

As shown in FIG. 11, the positive electrode terminal 12 of an upper rail 100" that includes one cell and the negative electrode terminal 24 of a lower rail 200" that includes one cell may be electrically connected in series with each other, and the negative electrode terminal 14 of the upper rail 100" and the positive electrode terminal 22 of the lower rail 200" may be electrically connected with each other by the wiring 300 to thus configure an entire circuit.

The structural reinforcement layer 110-1 may be the outermost upper layer of the upper rail 100", and under the upper structural reinforcement layer 110-1, the insulating layers 110-2 and 110-3 and the sealing layer 110-4 may be sequentially stacked from top to bottom.

Under the sealing layer 110-4, the first current collecting layer 120, the first electrode layers 130, 140, and 150, and the third current collecting layer 125 may be sequentially stacked.

The first electrode layers 130, 140, and 150 may include the positive electrode layer 130, the electrolyte layer 140, and the negative electrode layer 150 which are sequentially stacked from top to bottom. The positive electrode layer 130 and the negative electrode layer 150 may be made of the positive electrode active material 132 and the negative electrode active material 152 respectively formed between the glass fiber prepregs 134 and 154, and the electrolyte layer 140 may be made of the electrolyte formed between the glass fibers.

The lower structural reinforcement layer 215-1 may be the outermost lower layer of the lower rail 200", and on the lower structural reinforcement layer 215-1, the insulating layers 215-2 and 215-3 and the sealing layer 215-4 may be sequentially stacked from bottom to top.

On the sealing layer 215-4, the fourth current collecting layer 220, the third electrode layers 230, 240, and 250, and the fifth current collecting layer 225 may be sequentially stacked from top to bottom.

The third electrode layers 230, 240, and 250 may include the positive electrode layer 230, the electrolyte layer 240, and the negative electrode layer 250 which are sequentially stacked from top to bottom. The positive electrode layer 230 and the negative electrode layer 250 may be made of the positive electrode active material 232 and the negative electrode active material 252 respectively formed between the glass fiber prepregs 234 and 254, and the electrolyte layer 240 may be made of the electrolyte formed between the glass fibers.

The lower structural reinforcement layer 115 of the upper rail 100" and the upper structural reinforcement layer 210 of the lower rail 200" may be adhesively bonded with each other by the structural adhesive 275.

The upper rail-positive electrode terminal 12 may be interposed between the lower structural reinforcement layer 115 and the third current collecting layer 125 of the upper rail 100", and the lower rail-negative electrode terminal 24 may be interposed between the upper structural reinforcement layer 210 and the fourth current collecting layer 220 of the lower rail 200".

The upper rail-positive electrode terminal 12 and the lower rail-negative electrode terminal 24 may be electrically connected with each other by being adhesively bonded with each other by the conductive adhesive 285. Accordingly, one cell of the upper rail 100" and one cell of the lower rail 200" may be connected in series with each other.

Figure 13:
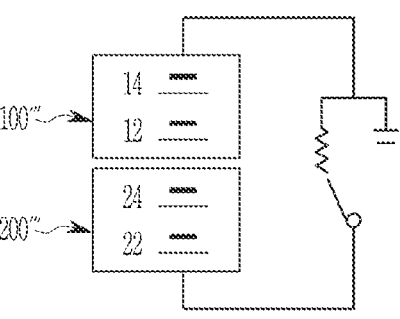
FIG. 13 is an equivalent circuit diagram of a structural battery for an electric vehicle according to yet another embodiment of the present invention.
Figure 14:
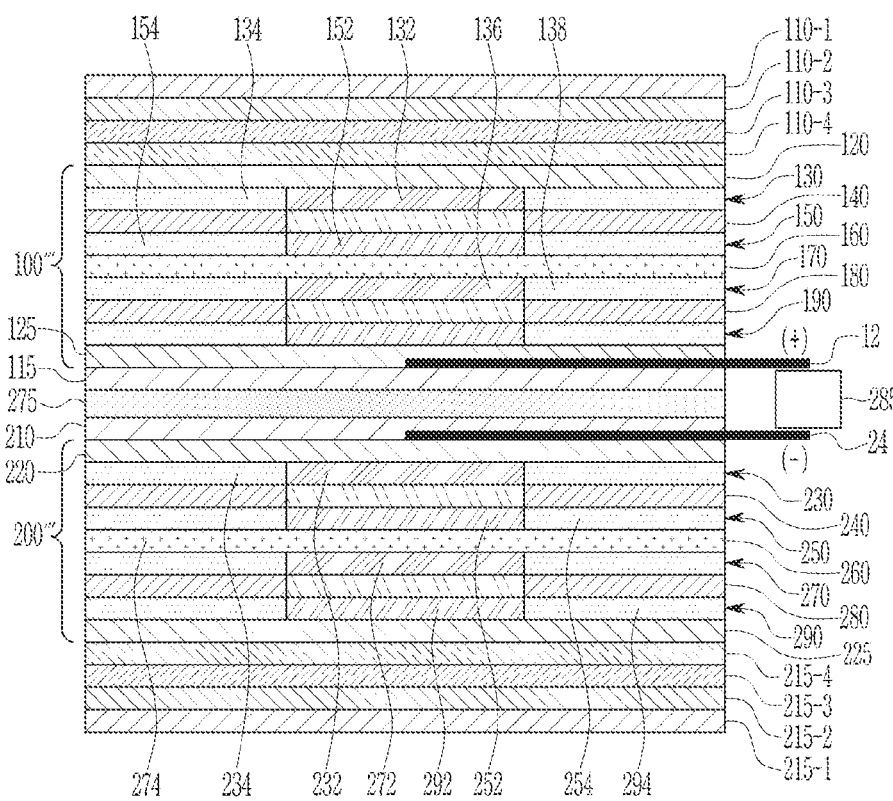
FIG. 14 is a cross-sectional view showing the structural battery for an electric vehicle of FIG. 13.

FIG. 13 is an equivalent circuit diagram of a structural battery for an electric vehicle according to yet another embodiment of the present invention, and FIG. 14 is a cross-sectional view showing the structural battery for an electric vehicle of FIG. 13.

As shown in FIG. 13, the positive electrode terminal 12 of an upper rail 100'" that includes two cells and the negative electrode terminal 24 of a lower rail 200'" including two cells may be electrically connected in series with each other, and the negative electrode terminal 14 of the upper rail 100'" and the positive electrode terminal 22 of the lower rail 200'" may be electrically connected with each other by the wiring 300 to thus configure an entire circuit.

The upper rail 100'" may include two cells, the structural reinforcement layer 110-1 may be the outermost upper layer of the upper rail 100", and under the upper structural reinforcement layer 110-1, the insulating layers 110-2 and 110-3 and the sealing layer 110-4 may be stacked from top to bottom.

Under the sealing layer 110-4, the first current collecting layer 120, the first electrode layers 130, 140, and 150, the second current collecting layer 160, the second electrode layers 170, 180, and 190, and the third current collecting layer 125 may be sequentially stacked.

The first electrode layers 130, 140, and 150 may include the positive electrode layer 130, the electrolyte layer 140, and the negative electrode layer 150 which are sequentially stacked from top to bottom. The positive electrode layer 130 and the negative electrode layer 150 may be made of the positive electrode active material 132 and the negative electrode active material 152 respectively formed between the glass fiber prepregs 134 and 154, and the electrolyte layer 140 may be made of the electrolyte formed between the glass fibers. The second current collecting layer 160 stacked under the first electrode layers 130, 140, and 150 may be made of the SUS material.

The second electrode layers 170, 180, and 190 stacked under the second current collecting layer 160 may include the positive electrode layer 170, the electrolyte layer 180, and the negative electrode layer 190 which are sequentially stacked from top to bottom. The positive electrode layer 170 and the negative electrode layer 190 may be made of the positive electrode active material 136 and the negative electrode active material 156 respectively formed between the glass fiber prepregs 138 and 158, and the electrolyte layer 180 may be made of the electrolyte formed between the glass fibers.

In addition, the lower rail 200'" may include two cells, the structural reinforcement layer 215-1 may be the outermost lower layer, and under the structural reinforcement layer 215-1, the fourth current collecting layer 220, the third electrode layers 230, 240, and 250, the sixth current collecting layer 260, the fourth electrode layers 270, 280, and 290, and the fifth current collecting layer 225 may be sequentially stacked from top to bottom.

The third electrode layers 230, 240, and 250 may include the positive electrode layer 230, the electrolyte layer 240, and the negative electrode layer 250 which are sequentially stacked from top to bottom. The positive electrode layer 230 and the negative electrode layer 250 may be made of the positive electrode active material 232 and the negative electrode active material 252 respectively formed between the glass fiber prepregs 234 and 254, and the electrolyte layer 240 may be made of the electrolyte formed between the glass fibers. The sixth current collecting layer 260 may be made of the SUS material.

The fourth electrode layers 270, 280, and 290 stacked under the sixth current collecting layer 260 may include the positive electrode layer 270, the electrolyte layer 280, and the negative electrode layer 290 which are sequentially stacked from top to bottom. The positive electrode layer 270 and the negative electrode layer 290 may be made of the positive electrode active material 272 and the negative electrode active material 292 respectively formed between the glass fiber prepregs 274 and 294, and the electrolyte layer 280 may be made of the electrolyte formed between the glass fibers.

Meanwhile, the lower structural reinforcement layer 115 of the upper rail 100" and the upper structural reinforcement layer 210 of the lower rail 200'" may be adhesively bonded with each other by the structural adhesive 275.

The upper rail-positive electrode terminal 12 may be interposed between the lower structural reinforcement layer 115 and the third current collecting layer 125 of the upper rail 100'", and the lower rail-negative electrode terminal 24 may be interposed between the upper structural reinforcement layer 210 and the fourth current collecting layer 220 of the lower rail 200'".

The upper rail-positive electrode terminal 12 and the lower rail-negative electrode terminal 24 may be electrically connected with each other by being adhesively bonded with each other by the conductive adhesive 285. Accordingly, two cells of the upper rail 100''' and two cells of the lower rail 200''' may be connected in series with each other.

Figure 15:
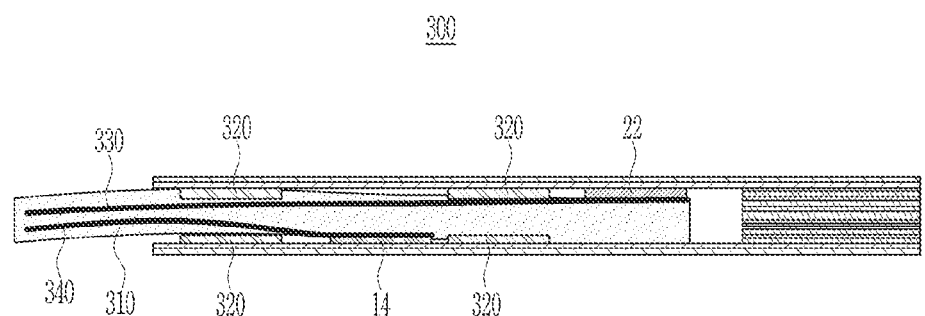
FIG. 15 is a cross-sectional view of the structural battery taken along line 'F-F' in FIG. 2A.

FIG. 15 is a cross-sectional view of the structural battery taken along line 'F-F' in FIG. 2A.

Referring to FIG. 15, the wiring 300 may be inserted into a flange groove positioned in an edge of a flange on which the lower rail 200 is mounted and extracted to the outside of the lower rail 200.

The wiring 300 may be formed by covering a negative electrode-wiring terminal 340 and a positive electrode-wiring terminal 330 by using a covering 310, the negative electrode-wiring terminal 340 may be connected to the upper rail-negative electrode terminal 14, and the positive electrode-wiring terminal 330 may be connected to the lower rail-positive electrode terminal 22.

The covering 310 of the wiring may be adhesively fixed to a plurality of parts in the flange groove by a fixing adhesive 320.

As set forth above, the structural battery for an electric vehicle according to embodiments of the present invention may boost the voltage by using the structural battery of the double rail structure that is applied as the roof rail of the vehicle body and has the serial connection structure.

The structural battery for an electric vehicle according to the embodiments of the present invention may also allow the vehicle to have the reduced weight and the improved cruising distance by simultaneously performing both the battery function and the frame of the vehicle body.

The structural battery may also prevent the damage to the current collector by inserting the wiring into the double rail structure to extract the external power.

Although the embodiments of the present invention have been described in detail hereinabove, the scope of the present invention is not limited thereto, and all equivalent modifications easily modified by those skilled in the art to which the present invention pertains are intended to fall within the scope and spirit of the present invention.

What is claimed is:

1. A structural battery for an electric vehicle, the structural battery comprising:
an upper rail comprising a first current collecting layer, a first electrode layer, a second current collecting layer, a second electrode layer, and a third current collecting layer sequentially stacked from top to bottom; and
a lower rail coupled with the upper rail, wherein the lower rail comprises a fourth current collecting layer, a third electrode layer, and a fifth current collecting layer sequentially stacked from top to bottom;
wherein the upper rail and the lower rail are electrically connected with each other by a terminal and a wiring so that the upper rail and the lower rail serve as both the structural battery and a roof rail of a vehicle body;
wherein each of the first, the second, and the third electrode layers comprises a positive electrode layer, an electrolyte layer, and a negative electrode layer sequentially stacked from top to bottom;
wherein the positive electrode layer and the negative electrode layer comprise a positive electrode active material and a negative electrode active material, respectively, between glass fiber prepregs; and
wherein the electrolyte layer comprises an electrolyte between glass fibers.

2. The structural battery of claim 1, wherein outermost upper and lower layers of the upper rail and the lower rail, respectively, are structural reinforcement layers.

3. The structural battery of claim 2, wherein, between a first structural reinforcement layer, of the structural reinforcement layers, and the upper rail or the lower rail, an insulating layer and a sealing layer are sequentially stacked starting from the first structural reinforcement layer.

4. The structural battery of claim 2, wherein the upper rail or the lower rail comprises one cell or a plurality of cells.

5. The structural battery of claim 4, wherein:
the upper rail comprises one cell; and
the lower rail comprises two cells disposed under the upper rail.

6. The structural battery of claim 4, wherein:
the upper rail comprises one cell; and
the lower rail comprises one cell disposed under the upper rail.

7. The structural battery of claim 4, wherein:
the upper rail comprises two cells stacked on each other; and
the lower rail comprises two cells disposed under the upper rail.

8. A structural battery for an electric vehicle, the structural battery comprising:
an upper rail comprising two cells stacked on each other, wherein the upper rail comprises a first current collecting layer, a first electrode layer, a second current collecting layer, a second electrode layer, and a third current collecting layer sequentially stacked from top to bottom; and
a lower rail coupled with the upper rail, the lower rail comprising one cell disposed under the upper rail, wherein the lower rail comprises a fourth current collecting layer, a third electrode layer, and a fifth current collecting layer sequentially stacked from top to bottom;
wherein the upper rail and the lower rail are electrically connected with each other by a terminal and a wiring, so that the upper rail and the lower rail serve as both the structural battery and a roof rail of a vehicle body;
wherein outermost upper and lower layers of the upper rail and lower rail, respectively, are structural reinforcement layers;
wherein each of the first, the second, and the third electrode layers comprises a positive electrode layer, an electrolyte layer, and a negative electrode layer sequentially stacked from top to bottom;
wherein the positive electrode layer and the negative electrode layer comprise a positive electrode active material and a negative electrode active material, respectively, between glass fiber prepregs; and
wherein the electrolyte layer comprises an electrolyte between glass fibers.

9. The structural battery of claim 8, wherein:
on a first side of the lower rail, a lower rail-negative electrode terminal is interposed between the structural reinforcement layer of the outermost upper layer of the lower rail and the fourth current collecting layer; and
on a second side of the lower rail, a lower rail-positive electrode terminal is interposed between the structural reinforcement layer of the outermost lower layer of the lower rail and the fifth current collecting layer.

10. The structural battery of claim 9, wherein:
on a first side of the upper rail, an upper rail-positive electrode terminal is interposed between the structural reinforcement layer of the outermost upper layer of the upper rail and the first current collecting layer; and
on a second side of the upper rail, an upper rail-negative electrode terminal is interposed between the structural reinforcement layer of the outermost lower layer of the upper rail and the third current collecting layer.

11. The structural battery of claim 10, wherein the structural reinforcement layer of the upper rail and the structural reinforcement layer of the lower rail are adhesively bonded with each other by a structural adhesive.

12. The structural battery of claim 10, wherein the lower rail-negative electrode terminal and the upper rail-positive electrode terminal are adhesively bonded with each other by a conductive adhesive.

13. The structural battery of claim 10, wherein:
the lower rail-positive electrode terminal and the upper rail-negative electrode terminal are electrically connected with each other by the wiring; and
the wiring is inserted into a flange groove positioned in an edge of a flange on which the lower rail is mounted and extracted to an outside of the lower rail.

14. The structural battery of claim 13, wherein:
the wiring is defined by a covering that covers a negative electrode-wiring terminal and a positive electrode-wiring terminal;
the negative electrode-wiring terminal is connected to the upper rail-negative electrode terminal; and
the positive electrode-wiring terminal is connected to the lower rail-positive electrode terminal.

15. The structural battery of claim 14, wherein the covering of the wiring is adhesively fixed into the flange groove by a fixing adhesive.

16. The structural battery of claim 11, wherein the lower rail-positive electrode terminal and the upper rail-negative electrode terminal are connected with each other in a direction perpendicular to the wiring to form an 'L'-shaped path.

17. A vehicle comprising:
a vehicle body comprising a floor;
a roof coupled to the vehicle body;
a high voltage battery coupled to the floor; and
a structural battery disposed in front of the roof in a transverse direction of the vehicle and connected with the high voltage battery, wherein the structural battery comprises:
an upper rail comprising at least one cell, wherein the upper rail comprises a first current collecting layer, a first electrode layer, a second current collecting layer, a second electrode layer, and a third current collecting layer sequentially stacked from top to bottom; and a lower rail comprising at least one cell, the lower rail being electrically connected to the upper rail by a terminal and a wiring so that the upper rail and the lower rail serve as both the structural battery and a roof rail of the vehicle body,
wherein the lower rail comprises a fourth current collecting layer, a third electrode layer, and a fifth current collecting layer sequentially stacked from top to bottom,
wherein each of the first, the second, and the third electrode layers comprises a positive electrode layer, an electrolyte layer, and a negative electrode layer sequentially stacked from top to bottom;
wherein the positive electrode layer and the negative electrode layer comprise a positive electrode active material and a negative electrode active material, respectively, between glass fiber prepregs; and
wherein the electrolyte layer comprises an electrolyte between glass fibers.

18. The vehicle of claim 17, wherein:
outermost upper and lower layers of the upper rail and the lower rail, respectively, are structural reinforcement layers;
on a first side of the lower rail, a lower rail-negative electrode terminal is interposed between the structural reinforcement layer of the outermost upper layer of the lower rail and the fourth current collecting layer; and
on a second side of the lower rail, a lower rail-positive electrode terminal is interposed between the structural reinforcement layer of the outermost lower layer of the lower rail and the fifth current collecting layer.

19. The vehicle of claim 18, wherein:
on a first side of the upper rail, an upper rail-positive electrode terminal is interposed between the structural reinforcement layer of the outermost upper layer of the upper rail and the first current collecting layer; and
on a second side of the upper rail, an upper rail-negative electrode terminal is interposed between the structural reinforcement layer of the outermost lower layer of the upper rail and the third current collecting layer.

20. The vehicle of claim 19, wherein the structural reinforcement layer of the upper rail and the structural reinforcement layer of the lower rail are adhesively bonded with each other by a structural adhesive.

* * * * *